United States Patent [19]

Müller et al.

[11] 4,020,749
[45] May 3, 1977

[54] BRAKE BOOSTER

[75] Inventors: Ewald Müller, Neu-Isenburg; Reimund Becht, Frankfurt-Hochst, both of Germany

[73] Assignee: ITT Industries, Inc., New York, N.Y.

[22] Filed: Aug. 2, 1976

[21] Appl. No.: 710,981

Related U.S. Application Data

[63] Continuation of Ser. No. 583,825, June 4, 1975, abandoned.

[30] Foreign Application Priority Data

Sept. 4, 1974 Germany ........................ 2442339

[52] U.S. Cl. ........................................ 92/48; 92/99
[51] Int. Cl.² ...................................... F01B 19/00
[58] Field of Search ............. 92/48, 98 D, 99, 100, 92/64; 91/369 A, 376 R; 60/553

[56] References Cited

UNITED STATES PATENTS

| | | | |
|---|---|---|---|
| 3,411,414 | 11/1968 | Brown | 92/48 |
| 3,420,145 | 1/1969 | Stumpe | 92/48 |
| R28,501 | 8/1975 | Weatherhogg | 92/48 |

*Primary Examiner*—Martin P. Schwadron
*Assistant Examiner*—Abraham Hershkovitz
*Attorney, Agent, or Firm*—John T. O'Halloran; Alfred C. Hill

[57] ABSTRACT

Tandem type vacuum brake boosters require a connection between their vacuum chambers. According to the present invention this connection is provided by the housing having crosspieces parallel to the longitudinal axis of the housing disposed about the periphery of the housing with channels formed between the crosspieces to enable the two vacuum chambers to communicate with each other.

10 Claims, 4 Drawing Figures

BRAKE BOOSTER

CROSS-REFERENCE TO RELATED APPLICATIONS

This is a continuation of application Ser. No. 583,825, filed June 4, 1975, now abandoned.

BACKGROUND OF THE INVENTION

This invention relates to a brake booster comprising a housing divided into two chambers by a partition. Each of these chambers include a vacuum chamber of constant pressure and a working chamber of variable pressure which are formed by a first booster piston on the side closest to the brake pedal and a second booster piston on the side closest to the master cylinder, with the vacuum chambers being in permanent mutual connection. Such a brake booster is known from the French Pat. No. 1,537,497.

In the known brake booster, the connection between the two vacuum chambers is provided by the fact that the housing of the brake booster has a larger diameter on the side closest to the master cylinder than on the side closest to the brake pedal. Into the sector of the larger diameter, a cup-shaped cylinder is inserted, the bottom of which forms the partition of the brake booster. An annular chamber is formed between the inserted cup-shaped cylinder and the larger-diameter sector of the housing of the brake booster. This annular chamber enables the vacuum to get from one vacuum chamber to the other vacuum chamber.

The prior known brake booster has the disadvantage that it is relatively complicated in design.

Above all, it is disadvantageous relative to cost that the cup-shaped cylinder has to be held inside the housing of the brake booster by distance members. The mounting of such a cup-shaped cylinder requires considerable expenditure, which raises the costs of the brake booster. The external diameter of the brake booster and the number of the members increase.

SUMMARY OF THE INVENTION

An object of the present invention is to provide a brake booster of the initially named type the manufacture of which is as cheap as possible, and which can be mounted in a very short time.

A feature of the present invention is the provision of a brake booster comprising: a housing having a longitudinal axis; a partition disposed transverse of the axis to divide the housing into two chambers; a first booster piston adjacent to brake pedal, transverse of the axis and in one of the two chambers to form a first working chamber of variable pressure remote from the partition and a first vacuum chamber of constant pressure adjacent the partition; a second booster piston disposed adjacent a master cylinder, transverse of the axis and in the other of the two chambers to form a second working chamber of variable pressure adjacent the partition and a second vacuum chamber of constant pressure remote from the partition; and a plurality of crosspieces disposed parallel to the axis about the periphery of the housing, the plurality of crosspieces providing channels to enable communication between the first and second vacuum chambers.

This inventive design has the advantage that no additional members are necessary to create the vacuum connection between the two vacuum chambers. The inventive crosspieces can be created by indentations of the housing of the brake booster. It has to be emphasized as well that owing to the inventive design, the diameter of the brake booster is not increased and that the model length is even shortened, which is important with regard to the space difficulties in the engine chamber of present day automotive vehicles.

An advantageous design of this invention is that the crosspieces are only provided in that part of the housing of the vacuum chamber on the side closest to the master cylinder, and that the crosspieces form, with end faces on the side closest to the brake pedal, axial stops for the partition, and that the partition is held in contact with these stops by indentations in the part of the housing on the side closest to the brake pedal. This design has advantages as to the manufacture. The crosspieces are made by indentations prior to the mounting process. During the mounting process, the partition is inserted into the housing of the brake booster from the side of the brake pedal until it abuts against the end faces of the crosspieces. Thereafter, the indentation of the part of the housing on the side closest to the brake pedal is made, resulting in the partition being firmly held against the crosspieces. Fastening by screws or welds is absolutely superfluous.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
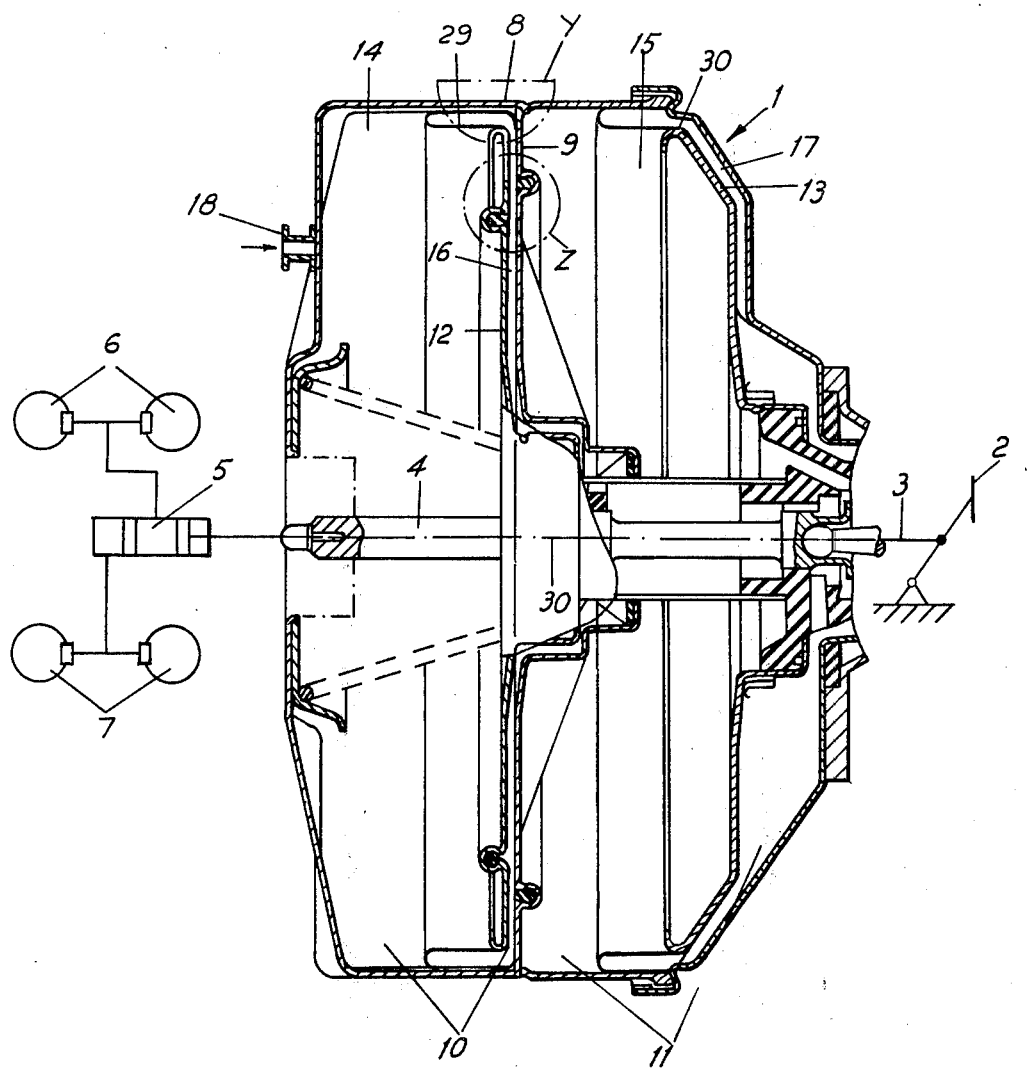
FIG. 1 is a longitudinal cross-sectional view of a brake booster in accordance with the principles of the present invention.

The inventive brake booster 1 illustrated in FIG. 1 is actuated by a brake pedal 2 via a tappet 3. Via an output rod 4, brake booster 1 acts on a master cylinder 5 via which brakes 6 and 7 are supplied with fluid in a known manner.

Brake booster 1 comprises a housing 8 having a longitudinal axis 30. Housing 8 is divided into two chambers 10 and 11 via a partition 9. Booster pistons 12 and 13 are arranged in each of chambers 10 and 11, respectively. Booster pistons 12 and 13 divide chambers 10 and 11 in such a way that in each of chambers 10 and 11 a vacuum chamber 14 and 15, respectively, and a working chamber 16 and 17, respectively, of variable pressure are formed.

When the brake is actuated, air is fed into the working chambers 16 and 17 so that booster pistons 12 and 13 move in the direction of master cylinder 5. Therefore, it is necessary that vacuum is permanently maintained in vacuum chambers 14 and 15. The vacuum is commonly fed to vacuum chamber 14 via a connector 18 by the suction line of the carburetor. There must be a permanent connection from vacuum chamber 14 to vacuum chamber 15 in order that the last named chamber is also evacuated permanently. In order to describe this connection in detail which is an essential part of this invention, reference is being made to the FIGS. 2 and 3. The housing of the brake booster is marked with 8 again in FIGS. 2 and 3. Housing 8 has indentations 19 and 20 running parallel to longitudinal axis 30 about its periphery so that crosspieces 21 and 22 running parallel to longitudinal axis 30 are formed about the overall periphery of housing 8. Channels 23, 24 and 25 running parallel to longitudinal 30 as well as are created between crosspieces 21 and 22. Each of crosspieces 21 and 22 has an end face 26 on the side closest to the brake pedal against which partition 9 abuts. Partition 9 is held in this position by indentations 27 which are made after partition 9 has been inserted. In order to create a vacuum connection between vacuum chambers 14 and 15, partition 9 has passages 28 at the outer periphery in the area of the channels 23, 24 and 25.

Figure 4:
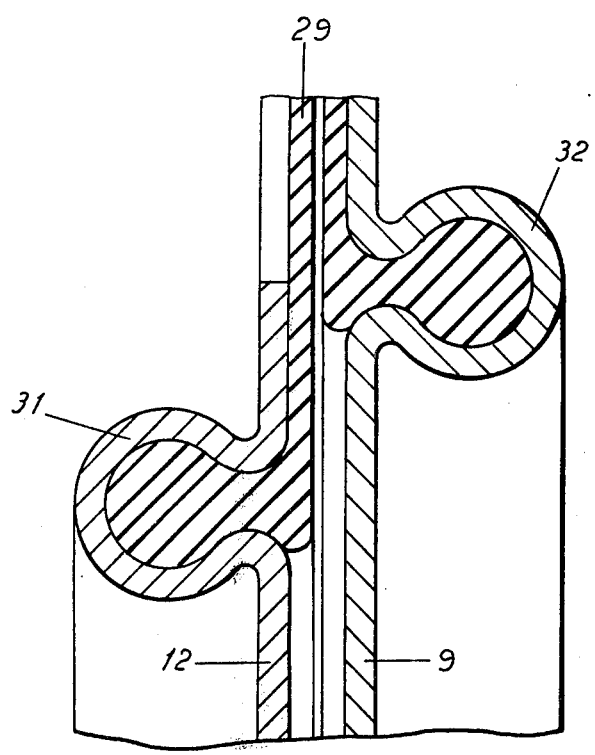
FIG. 4 is an enlarged cross-sectional view of detail Z of FIG. 1.

Reference is made to FIG. 1 again. The two booster pistons 12 and 13 must be sealed relative to vacuum chambers 14 and 15. Rolling diaphragms 29 and 30 serve this purpose. While rolling diaphragm 30 is fastened to booster piston 13 and to housing 8, rolling diaphragm 29 of booster piston 12 on the side closest to the master cylinder is fastened to booster piston 12, on the one hand, and to partition 9, on the other hand. According to this invention, this rolling diaphragm 29 is fastened by clench-rolled seals 31 and 32 as shown in detail in FIG. 4.

Figure 2:
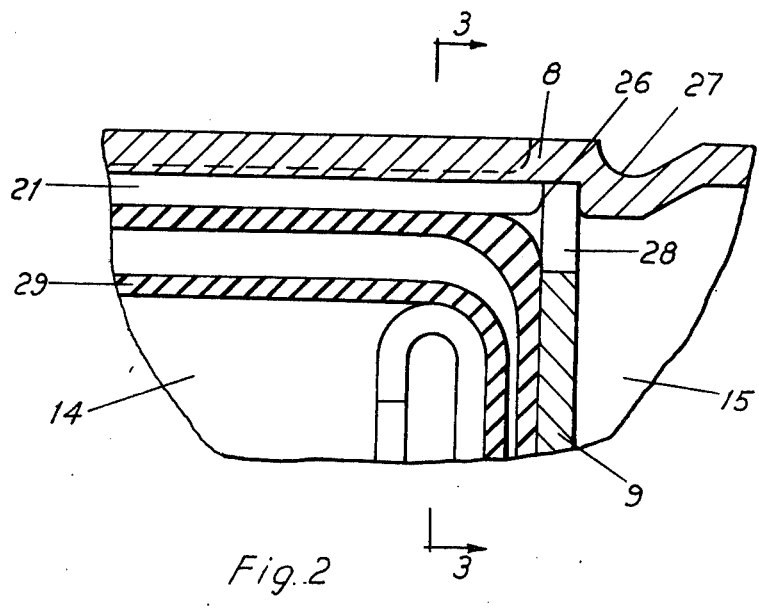
FIG. 2 is an enlarged cross-sectional view of detail Y of FIG. 1.
Figure 3:
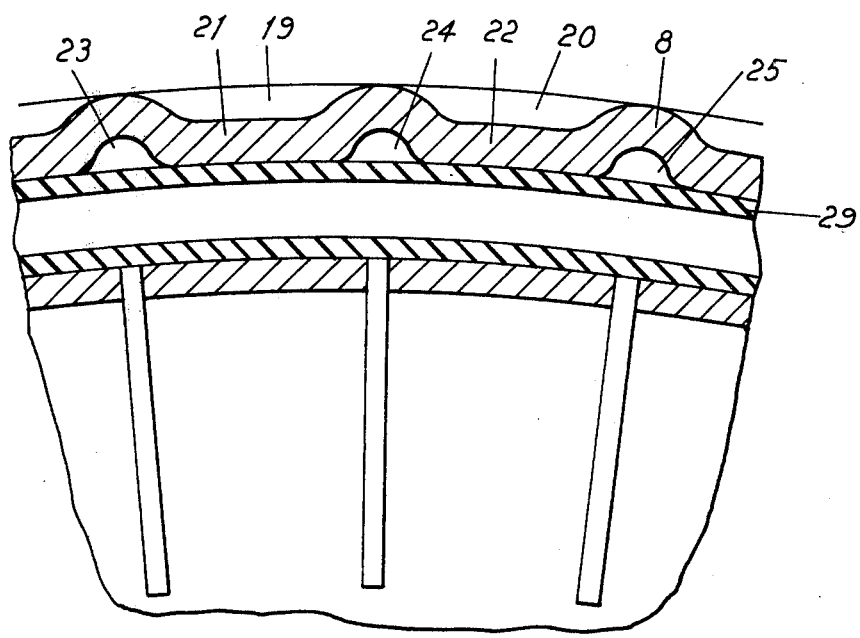
FIG. 3 is a transverse cross-sectional view taken along line 3—3 of FIG. 2.

FIGS. 2 and 3 show that rolling diaphragm 29 abuts against crosspieces 21 and 22. Channels 23, 24 and 25, however, remain free so that vacuum from vacuum chamber 15 communicates with vacuum chamber 14 via passage 28 and channels 23, 24 and 25.

While we have described above the principles of our invention in connection with specific apparatus it is to be clearly understood that this description is made only by way of example and not as a limitation to the scope of our invention as set forth in the objects thereof and in the accompanying claims.

We claim:
1. A brake booster comprising:
   a housing having a longitudinal axis;
   a partition disposed transverse of said axis to divide said housing into two chambers;
   a first booster piston disposed adjacent one end of said housing, transverse of said axis and in one of said two chambers to form a first working chamber of variable pressure remote from said partition and a first vacuum chamber of constant pressure adjacent said partition;
   a second booster piston disposed adjacent the other end of said housing, transverse of said axis and in the other of said two chambers to form a second working chamber of variable pressure adjacent said partition and a second vacuum chamber of constant pressure remote from said partition; and
   a plurality of elongated spaced crosspieces formed in said housing disposed parallel to said axis about the periphery of said housing, said plurality of crosspieces being formed by spaced inward indenting of said housing and said adjacent ones of said plurality of crosspieces forming a plurality of elongated spaced channels therebetween parallel to said axis to enable communication between said first and second vacuum chambers.

2. A brake booster according to claim 1, further including
   a rolling diaphragm to connect said second booster piston to said partition in a sealed manner.

3. A brake booster according to claim 2, wherein said diaphragm is connected to said second booster piston by a first clench-rolled seal and to said partition by a second clench-rolled seal.

4. A brake booster according to claim 3, wherein said plurality of crosspieces are only provided in said other of said two chambers of said housing.

5. A brake booster according to claim 4, wherein each of said plurality of crosspieces having an end face transverse to said axis to provide stops for said partition, and further including
   additional inward indentations in said housing in said one of said two chambers of said housing to hold said partition in contact with said end faces.

6. A brake booster according to claim 5, wherein said partition includes
   passages at its outer periphery in the area of said channels.

7. A brake booster according to claim 1, wherein said plurality of crosspieces are only provided in said other of said two chambers of said housing.

8. A brake booster according to claim 7, wherein each of said plurality of crosspieces having an end face transverse of said axis to provide stops for said partition, and further including
   additional inward indentations in said housing in said one of said two chambers of said housing to hold said partition in contact with said end faces.

9. A brake booster according to claim 1, wherein each of said plurality of crosspieces having an end face transverse to said axis to provide stops for said partition, and further including
   additional inward indentations in said housing in said one of said two chambers of said housing to hold said partition in contact with said end faces.

10. A brake booster according to claim 1, wherein said partition includes
    passages at its outer periphery in the area of said channels.

* * * * *